UNITED STATES PATENT OFFICE.

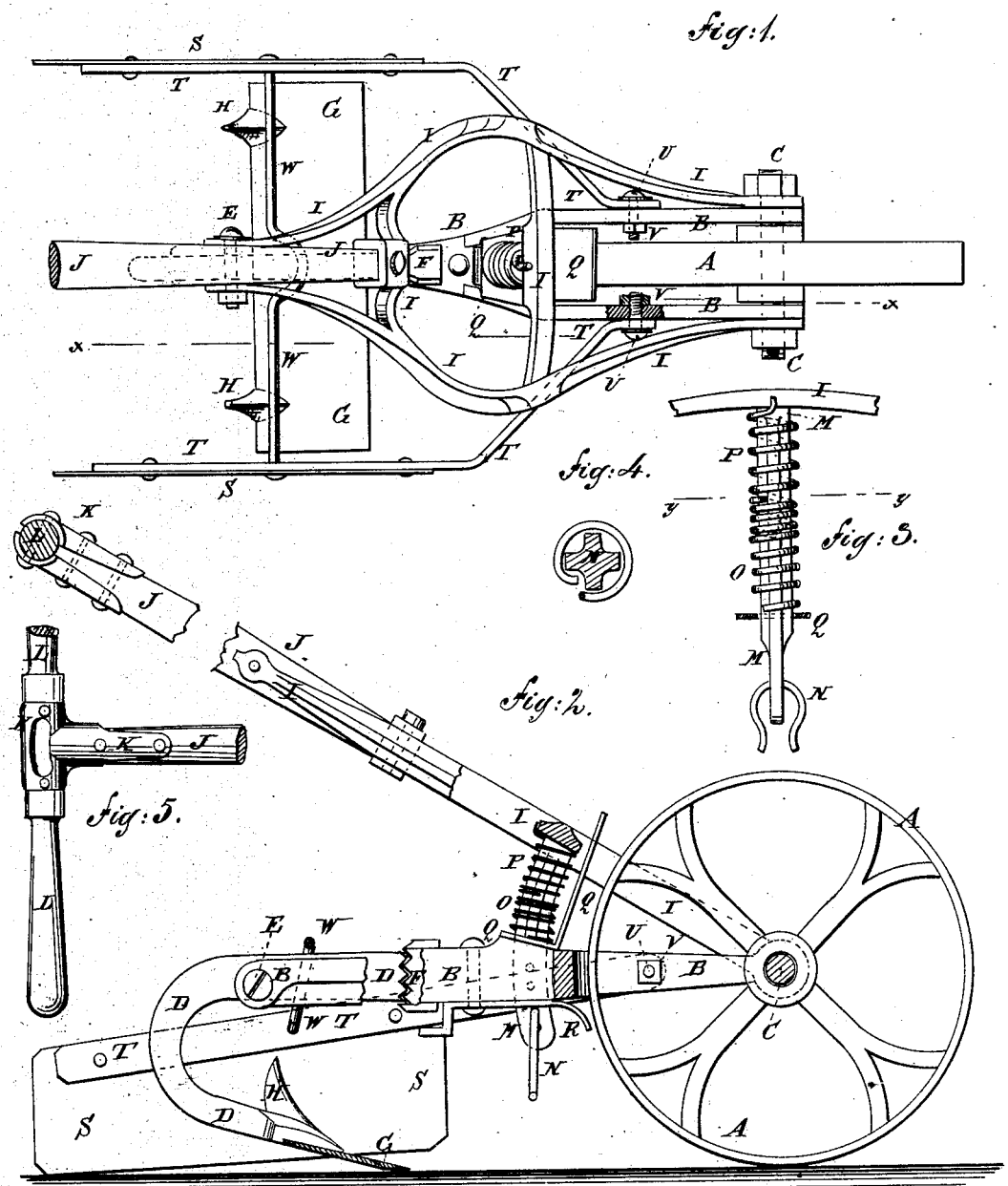

HENRY B. SHERWOOD, OF WESTPORT, CONNECTICUT.

HAND-CULTIVATOR.

SPECIFICATION forming part of Letters Patent No. 237,057, dated January 25, 1881.

Application filed August 19, 1880. (No model.)

*To all whom it may concern:*

Be it known that I, HENRY B. SHERWOOD, of Westport, in the county of Fairfield and State of Connecticut, have invented a new and useful Improvement in Adjustable Hand-Cultivators, of which the following is a specification.

Figure 1 is a plan view of the improvement. Fig. 2 is a sectional side elevation taken through the line $x\ x$, Fig. 1. Fig. 3 is a front elevation of the adjustable spring and its support. Fig. 4 is a sectional plan view taken through the line $y\ y$, Fig. 3. Fig. 5 is a plan view of the upper part of the handle.

Similar letters of reference indicate corresponding parts.

The object of this invention is to furnish hand-cultivators so constructed that the hoe can be adjusted at any desired inclination; that they will break up the crust or baked soil; that they will protect small plants from the soil moved by the hoes; and that they will be held down by spring-pressure to make them run easy when at work, and prevent them from jarring the operators should the hoes strike obstructions.

A represents the wheel, which is made with a wide rim, and is pivoted to the forked forward end of the beam B by a bolt, C. The rear part of the beam B is slotted longitudinally and vertically to receive the upper arm of the standard D, which is secured in place by a bolt, E, passing through it and through the rear end of the beam B. The forward end of the upper arm of the standard D is serrated to engage with the serrated rear side of the holding-block F, secured in the forward end of the slot in the beam B, so that by taking out the bolt E the standard D may be adjusted upon the block F to give any desired inclination to the hoe G. The standard D is curved into U form to bring its lower arm into proper position to receive the hoe G, which fits into a seat upon the lower side of the end of the said standard, and is secured in place by rivets or screws.

To the upper side of the rear part of the hoe G are attached spurs H, which, as the hoe G is drawn forward beneath the crust or baked surface of the ground, break the said crust into pieces. Two or more spurs, H, may be used, as the length of the hoe G may require.

I is the handle-holder, which has two arms upon its lower part that pass down upon the opposite sides of the wheel A and beam B, and have holes in their lower ends to receive the ends of the axle-bolt C, where they are secured in place by the nuts screwed upon the said ends. The handle-holder I has a socket in its upper part to receive the end of the handle J, and two arms to rest against the opposite sides of the said handle J, where they are secured in place by a bolt or rivet.

To the upper and lower sides of the upper end of the handle J are secured two semi-cylindrical plates, K, the upper ends of which project beyond the end of the handle J, and have semi-cylindrical cross-heads formed upon them to receive the cross-bar or hand-piece L. The cross-bar L is secured in place by bolts or rivets passing through it and through the said plates K. The concavities of the clamping-plates K are made of such a size that the edges of the said plates K do not quite meet, so that should the handle J or hand-piece L shrink, or become loose otherwise, they can be tightened by tightening the fastening rivets or bolts that secure them to and between the clamping-plates K.

To the center of a cross-bar formed upon or attached to the middle part of the handle-holder I is attached, or upon it is formed, an arm, M, which projects downward and is curved forward, as shown in Fig. 2, so as to pass through a mortise or short slot in the solid middle part of the beam B. The arm M is held from being drawn out of the slot in the beam B by a wire loop, N, or other suitable fastening passed through a hole in the lower part of the said arm and resting against the lower side of the said beam. Several holes are formed through the lower part of the arm M, to receive the fastening N, so that the handle can be raised and lowered, as the height of the operator may require. The arm M is grooved, channeled, or rabbeted longitudinally to receive the inwardly-bent upper end of the lower part, O, of a spiral spring to prevent the said part of the spring from turning upon the said arm M. Upon the upper part of the arm M is placed the upper part, P, of a spiral spring, the upper end of which is bent outward and then upward to rest against the cross-bar of the handle-holder I, and prevent the said upper part, P, of the spring from turning when raised against the said cross-bar. The two parts O P of the spring are coiled in the same direction, so that the lower coils of the upper part, P, can be turned down between the upper coils of the lower part, O, to lengthen and shorten the spring, by removing the fastening N and raising the arm M enough to take the upper end of the part P of the spring out of gear with the cross-bar of the handle-holder I, so that the said spring O P can be adjusted to support the handle at any inclination into which it may be adjusted. The lower end of the spring O P rests upon the plate Q, placed upon the beam B, and slotted to allow the arm M to pass through it. The rear part of the plate Q is bent upward at an angle and passes up at the rear side of the spring O P, to serve as a guard to protect the said spring from dirt from the wheel A.

To the lower side of the solid middle part of the beam B is attached a plate, R, the rear end of which is curved downward and projects into such a position as to serve as a scraper for removing any soil that may adhere to the rim of the wheel A. At each side of the hoe G is placed a plate, S, to serve as a guard or fender to prevent small plants from being covered or injured by soil from the said hoe G. The plates S are attached at their upper edges to the rear parts of bars T, the forward parts of which are bent inward and forward, and have holes through their ends to receive the screws U. The screws U are screwed into screw-holes in the arms of the beam B, and are made of such a length as to project at the inner side of the said arms to receive jam-nuts V, to lock the said screws U in place and prevent them from being worked loose by the play of the bars T.

To the rear parts of the bars T are attached the ends of a connecting-rod, W, to keep the fenders S always at the same distance apart. The middle part of the connecting-rod W has a loop or bend formed in it to receive the rear part of the beam B, to hold the fender-plates S from lateral movement, while allowing them to move up and down freely to adjust themselves to an uneven surface of ground.

Having thus described my invention, what I claim as new, and desire to secure by Letters Patent, is—

1. In a hand-cultivator, the combination of the wheel A, the forked and slotted beam B, the axle-bolt C, the bent standard D, carrying hoe G, and having a serrated forward end engaging the serrated holding-block F, the handle-holder I, the handle J, the arm M, and the spiral spring O P, as and for the purpose specified.

2. In a hand-cultivator, the combination, with the beam B and the handle-holder I, of the curved and channeled arm M, the fastening N, and the spiral spring, made in two parts, O P, the lower part, O, having its upper end bent inward to engage with the channeled arm M, and the upper part, P, having its upper end bent upward to engage with the cross-bar of the handle-holder I, whereby the handle can be adjusted at any desired inclination, as set forth.

3. The combination, with the bars T, carrying the fender-plates S and the beam B, of the connecting-rod W, having a U bend or loop in its middle part to receive the beam, substantially as herein shown and described, whereby a lateral movement of the fenders is prevented, as set forth.

HENRY B. SHERWOOD.

Witnesses:
  MOSES W. WILSON,
  MARGARET E. WILSON.